(12) United States Patent
Nakano

(10) Patent No.: US 11,745,406 B2
(45) Date of Patent: Sep. 5, 2023

(54) FILM FORMING APPARATUS

(71) Applicant: SUMITOMO HEAVY INDUSTRIES MODERN, LTD., Kanagawa (JP)

(72) Inventor: Katsuyuki Nakano, Kanagawa (JP)

(73) Assignee: SUMITOMO HEAVY INDUSTRIES MODERN, LTD., Tokyo (JP)

( * ) Notice: Subject to any disclaimer, the term of this patent is extended or adjusted under 35 U.S.C. 154(b) by 167 days.

(21) Appl. No.: 16/113,329

(22) Filed: Aug. 27, 2018

(65) Prior Publication Data

US 2018/0361647 A1 Dec. 20, 2018

Related U.S. Application Data

(63) Continuation of application No. PCT/JP2017/012369, filed on Mar. 27, 2017.

(30) Foreign Application Priority Data

Mar. 28, 2016 (JP) .................. 2016-063515

(51) Int. Cl.
*B29C 48/92* (2019.01)
*B29C 48/10* (2019.01)
(Continued)

(52) U.S. Cl.
CPC .......... *B29C 48/92* (2019.02); *B29C 48/0018* (2019.02); *B29C 48/08* (2019.02);
(Continued)

(58) Field of Classification Search
CPC ......... B29C 48/10; B29C 48/30; B29C 48/32; B29C 48/36; B29C 48/92; B29C 47/0018;
(Continued)

(56) References Cited

U.S. PATENT DOCUMENTS 3,368,007 A * 2/1968 Palmer .................... B29C 48/33
425/327
5,110,518 A 5/1992 Halter
(Continued)

FOREIGN PATENT DOCUMENTS

DE         40 00 530 A1      5/1991
DE            4000530 A1 *   5/1991     ............. B29C 48/92
(Continued)

OTHER PUBLICATIONS

Predoehl; English Translation of DE4000530; "Production of blown thermoplastic film"; (1991) (Year: 1991).*

(Continued)

*Primary Examiner* — Francisco W Tschen
*Assistant Examiner* — Edgaredmanuel Troche
(74) *Attorney, Agent, or Firm* — Michael Best & Friedrich LLP

(57) ABSTRACT

A film forming apparatus includes a die device which extrudes a molten resin in a tube shape to form a film, a measurement unit which measures a thickness profile of a film in a circumferential direction, a plurality of adjustment portions which change the thickness profile of the film, and a controller which controls the plurality of adjustment portions such that the thickness profile approaches a target thickness profile. The controller changes the target thickness profile based on the measured thickness profile.

20 Claims, 7 Drawing Sheets

(51) Int. Cl.
  *B29C 48/08*    (2019.01)
  *B29C 48/00*    (2019.01)
  *B29C 48/32*    (2019.01)
  *B29C 48/88*    (2019.01)
  *B29C 48/325*   (2019.01)
  B29C 48/28      (2019.01)
  B29L 23/00      (2006.01)

(52) U.S. Cl.
  CPC .............. *B29C 48/10* (2019.02); *B29C 48/28* (2019.02); *B29C 48/32* (2019.02); *B29C 48/325* (2019.02); *B29C 48/913* (2019.02); *B29C 2948/92152* (2019.02); *B29C 2948/92647* (2019.02); *B29L 2023/001* (2013.01)

(58) Field of Classification Search
  CPC ....... B29C 47/20; B29C 47/92; B29C 48/325; B29C 2948/92152; B29C 2948/92647; B29C 48/0017–0018; B29C 48/2556; B29K 2995/005
  USPC .................................................. 425/174, 327
  See application file for complete search history.

(56) References Cited

U.S. PATENT DOCUMENTS

| | | | |
|---|---|---|---|
| 5,397,514 A | | 3/1995 | Breil et al. |
| 6,039,904 A | * | 3/2000 | Nitta .................... B29C 48/313 264/40.5 |
| 2006/0057405 A1 | * | 3/2006 | Kagawa .............. B29C 61/0616 428/458 |
| 2007/0278721 A1 | * | 12/2007 | Feuerherm .............. B29C 48/09 264/531 |
| 2015/0021811 A1 | * | 1/2015 | Eckhardt ................ B29C 48/08 425/466 |
| 2015/0064302 A1 | * | 3/2015 | Feuerherm .............. B29C 48/09 425/466 |

FOREIGN PATENT DOCUMENTS

| | | | | |
|---|---|---|---|---|
| DE | 42 22 260 | A1 | | 1/1993 |
| DE | 4222260 | A1 | * | 1/1993 ............. B29C 48/10 |
| DE | 202010007275 | U1 | * | 7/2011 ......... B29C 47/0023 |
| DE | 102011018320 | A1 | * | 10/2012 ......... B29C 48/0018 |
| EP | 0 508 167 | A2 | | 10/1992 |
| EP | 0508167 | A2 | * | 10/1992 ............. B29C 48/10 |
| EP | 2 514 580 | A2 | | 10/2012 |
| EP | 2514580 | A2 | * | 10/2012 ......... B29C 48/0018 |
| JP | H01-128821 | A | | 5/1989 |
| JP | H03-164227 | A | | 7/1991 |
| JP | H03-216324 | A | | 9/1991 |
| JP | H06-502131 | A | | 3/1994 |
| JP | H06-099472 | A | | 4/1994 |
| JP | H08-276491 | A | | 10/1996 |
| JP | 09225995 | A | * | 9/1997 ............. B29C 48/10 |
| JP | H09-225995 | A | | 9/1997 |
| JP | H11-005249 | A | | 1/1999 |
| JP | 2001-310372 | A | | 11/2001 |
| JP | 2001-313072 | A | | 11/2001 |
| JP | 2005-186377 | A | | 7/2005 |
| JP | 2013-240897 | A | | 12/2013 |
| JP | 2015205449 | A | * | 11/2015 |
| TW | 2014-12496 | A | | 4/2014 |

OTHER PUBLICATIONS

Schaefer, Klaus; English Translation of DE4222260A1; "Production of blown plastic film tubing . . . "; (1993) (Year: 1993).*
Bayer, Bernd; English Translation of DE102011018320A1; "Method for regulating the thickness profile of blow films"; (2012) (Year: 2012).*
Saruwatari, Shinji; English translation of "Uneven-Thickness-Adjusting Method for Resin Film in Extrusion Molding and Resin Film-Molding Device"; (1997); (Year: 1997).*
Machine English translation of DE-4000530-A1 (Year: 1991).*
Machine English translation of EP-2514580-A2 (Year: 2012).*
Machine English translation of Yamamura et al. JP2015205449A (2014) (Year: 2014).*
Machine English translation of Mauser Werke GmbH (DE202010007275U1) (Year: 2011).*
Search Report issued in European Application No. 17774924.9, dated Oct. 25, 2019.
International Search Report issued in Application No. PCT/JP2017/012369, dated Apr. 25, 2017.
Office Action issued in Chinese Application No. 201780007316.5, dated Oct. 8, 2019.
Office Action issued in Japanese Application No. 2016-063515, dated Sep. 10, 2019.

* cited by examiner

FILM FORMING APPARATUS

RELATED APPLICATIONS

Priority is claimed to Japanese Patent Application No. 2016-063515, filed Mar. 28, 2016, and International Patent Application No. PCT/JP2017/012369, filed Mar. 27, 2017, the entire content of each of which is incorporated herein by reference.

BACKGROUND

Technical Field

Certain embodiments of the present invention relate to a film forming apparatus.

Description of Related Art

In the related art, a film forming apparatus is known, which solidifies a molten resin extruded in a tube shape from an annular discharge port of a die device to form a film. In the related art, a film forming apparatus is suggested, which changes a radial width of an annular discharge port to decrease variations in a film thickness.

SUMMARY

According to an embodiment of the present invention, there is provided a film forming apparatus including: a die device which extrudes a molten resin in a tube shape to form a film; a measurement unit which measures a thickness profile of a film in a predetermined direction; an adjustment portion which changes the thickness profile of the film; and a controller which controls the adjustment portion such that the thickness profile approaches a target thickness profile. The controller changes the target thickness profile based on the measured thickness profile.

According to another embodiment of the present invention, there is provided a film forming apparatus including: a die device which extrudes a molten resin in a tube shape to form a film; a measurement unit which measures a film thickness at each position in a predetermined direction; an adjustment portion which changes the film thickness at each position; and a controller which controls the adjustment portion such that the film thickness at each position approaches a film thickness. The controller controls the adjustment portion such that a film thickness of a portion of the film thicker than the reference film thickness is temporarily thinner than the reference film thickness at a predetermined timing and a film thickness of a portion of the film thinner than the reference film thickness is temporarily thicker than the reference film thickness at a predetermined timing.

DETAILED DESCRIPTION

Figure 1:
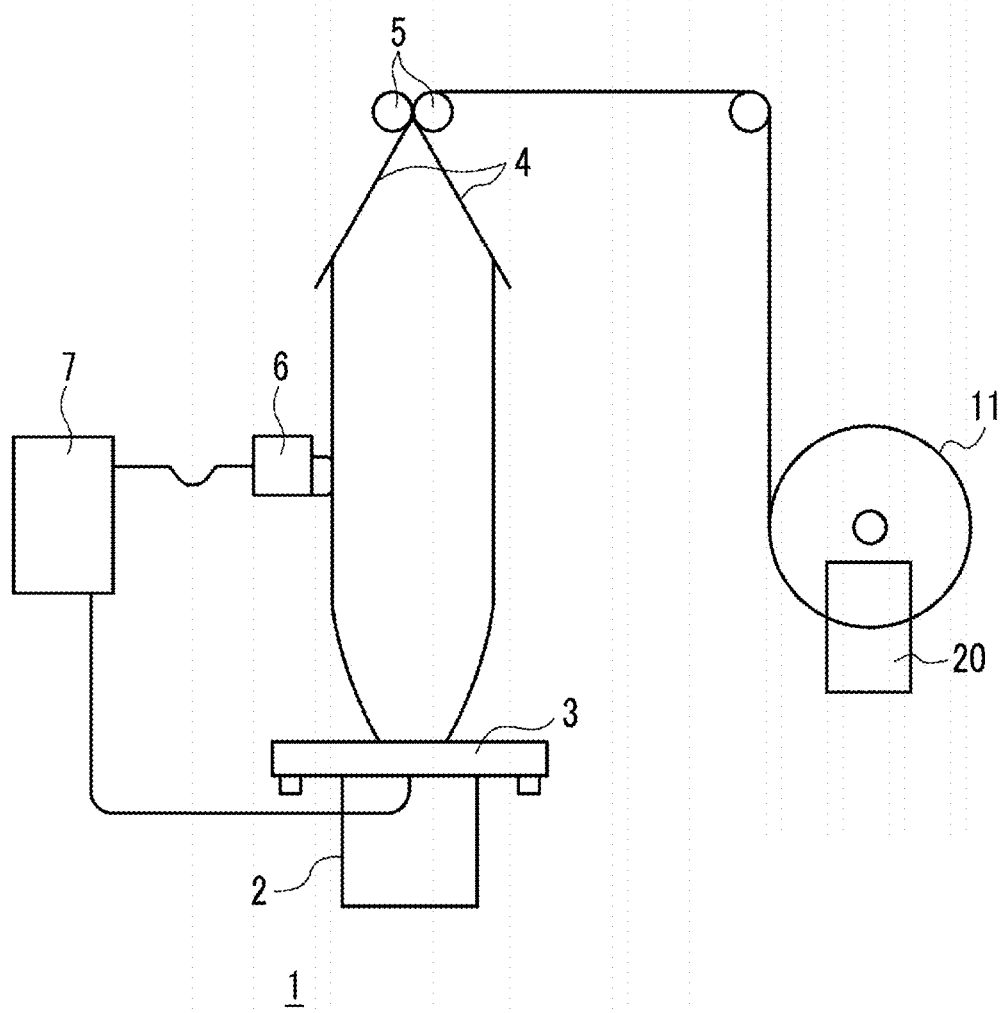
FIG. 1 is a view showing a schematic configuration of a film forming apparatus according to a first embodiment.

According to the film forming apparatus of the related art, the variations in the film thickness can be reduced to some extent and accuracy as a film can be satisfied. However, there are some variations in the thickness of the film, and thus, in a case where a film is wound such that a film roll body is formed, if the variations accumulates, a large protrusion or recess may occur.

It is desirable to provide a film forming apparatus capable of forming a film roll body having a relatively small protrusion or recess or a small protrusion or recess.

In addition, aspects of the present invention include any combination of the above-described elements and mutual substitution of elements or expressions of the present invention among methods, apparatuses, systems, or the like.

According to the present invention, it is possible to form a film having small thickness variations and uniform physical properties.

Hereinafter, the same reference numerals are assigned to the same or equivalent components and members shown in the each drawing and overlapping description thereof are appropriately omitted. In addition, the dimensions of the members in each drawing are appropriately enlarged and reduced for easy understanding. Moreover, in each drawing, the embodiment is described such that some of the members not important for explaining the embodiment are omitted.

A process of obtaining a film forming apparatus according to an embodiment will be explained. In general, a film formed by a film forming apparatus has variations in a film thickness somewhat. Even though the variations satisfy accuracy as a film, when a film roll body is formed by winding up a film by a winding machine, if the variations accumulate, more specifically, if portions having thick film thickness or a portions having thin film thickness are piled up, a protrusion or a recess occurs. The protrusion or the recess of the film roll body causes strain of the film.

In the related art, by gradually shifting relatively a position of a molten resin extruded from a die device in a circumferential direction and a position of a film piled up when the film is wound up, in other words, by twisting the film, occurrence of a protrusion or recess in a film roll body is suppressed. Specifically, occurrence of the protrusion or recess in the film roll body is suppressed by twisting the film according to the following methods 1 to 4.

1. twist a film by rotating a pinch portion of a winding machine
2. twist the film by placing the pinch portion of the winding machine and the winding machine on a rotating table and rotating the rotating table
3. twist the film by rotating a die device
4. twist the film by placing the die device and an extruder on the rotating table and rotating the rotating table However, in the methods 1 and 2, problems may occur, such as scratching of the film, fluctuation in a folding width of the film, or wrinkling or slack in the film. In the method 3, it is necessary to slide a connecting portion of the molten resin supplied from the extruder to the die device, and thus, there is a problem that the molten resin leaks and durability decreases. Moreover, in the method 3, the die device is rotated with respect to a central axis, and thus, the connecting portion should also be disposed along the central axis, and this method can be applied only to single layer extrusion. In the methods 1 to 4, a rotating device is required, and a cost thereof increases. Moreover, an installation space of the apparatus becomes large. Particularly, in the method 4, the extruder and the die device are rotated, and thus, the rotating device becomes large.

Based on the-above described findings, the present inventor has reached a film forming apparatus according to the present embodiment. Hereinafter, the film forming apparatus will be described in detail.

First Embodiment

FIG. 1 a view showing a schematic configuration of a film forming apparatus 1 according to a first embodiment. The film forming apparatus 1 forms a film having a tube shape. The film forming apparatus 1 includes a die device 2, a cooling device 3, a pair of stabilizing plates 4, a pair of pinch rolls 5, a thickness sensor 6, a controller 7, and a winding machine 20.

The die device 2 forms a molten resin supplied from an extruder (not shown) in a tube shape. Particularly, the die device 2 extrudes the molten resin from a ring-shaped slit 18 (described later in FIG. 2) and forms the molten resin in a tube shape. The cooling device 3 is disposed above the die device 2. The cooling device 3 blows cooling air from the outside to the molten resin extruded from the die device 2. The molten resin is cooled, and thus, the film is formed.

The pair of stabilizing plates 4 is disposed above the cooling device 3 and guides the formed film to a portion between the pair of pinch rolls 5. The pinch rolls 5 are disposed above the stabilizing plates 4 and flatly fold the guided film while pulling the film. The winding machine 20 winds up the folded film to form a film roll body 11.

The thickness sensor 6 is disposed between the cooling device 3 and the stabilizing plates 4. The thickness sensor 6 continuously measures a thickness of the film at each position in a circumferential direction while going around the tube-shaped film. That is, the thickness sensor 6 continuously measures a thickness profile of the film in the circumferential direction. The thickness sensor 6 sends the measured thickness profile to the controller 7. In addition, the thickness sensor 6 may send a thickness profile, which is obtained by averaging measurement results of two or more laps, to the controller 7. The controller 7 sends a control command corresponding to the thickness profile accepted from the thickness sensor 6 to the die device 2. The die device 2 receives the control command and adjusts a width of a slit 18 (particularly, a discharge port thereof) so as to decrease variations in the thickness.

Figure 2:
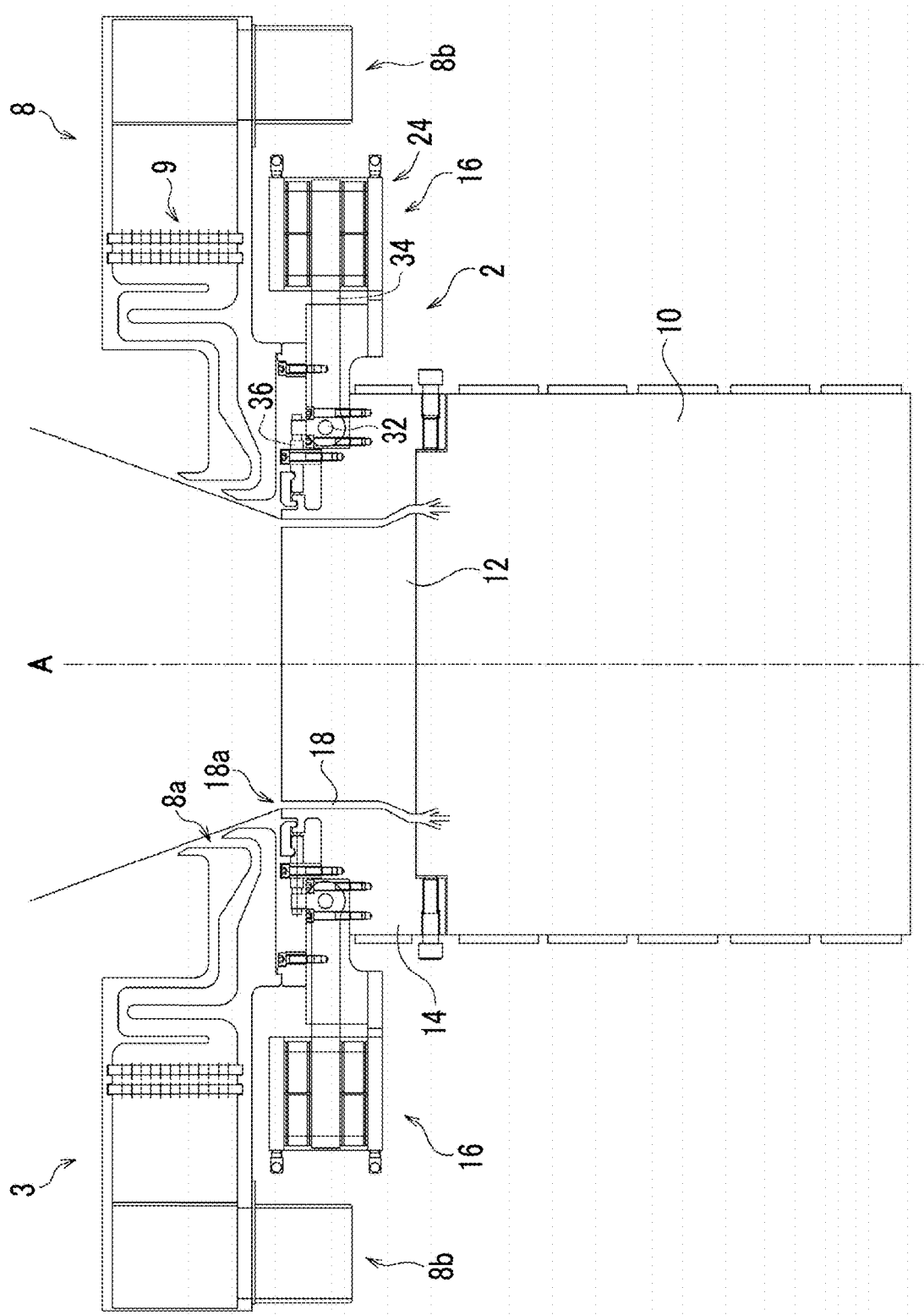
FIG. 2 is a sectional view showing a die device and a cooling device of FIG. 1 and peripheries thereof.
Figure 3:
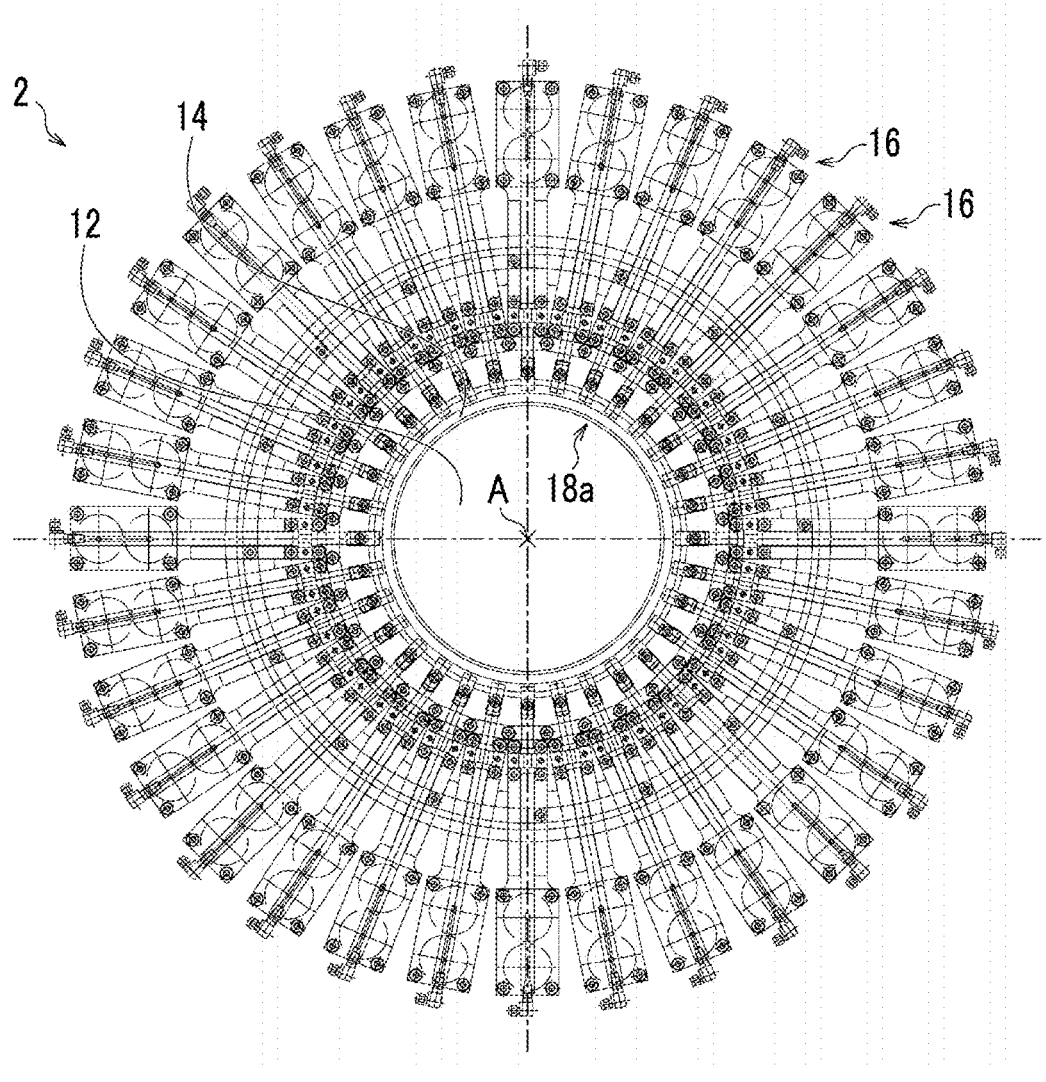
FIG. 3 is a top view showing the die device of FIG. 1.

FIG. 2 is a sectional view showing the die device 2 and the cooling device 3 and peripheries thereof. FIG. 3 is a top view showing the die device 2. In FIG. 3, the cooling device 3 is not shown.

The cooling device 3 includes an air ring 8 and an annular rectifying member 9. The air ring 8 is a ring-shaped casing of which an inner peripheral portion is recessed downward. A ring-shaped outlet 8a having an open upper side is formed on an inner peripheral portion of the air ring 8. Particularly, the outlet 8a is formed to be concentric with the ring-shaped slit 18 having a central axis A as a center.

In addition, hereinafter, a direction parallel to the central axis A is referred to as an axial direction, any direction passing through the central axis A on a plane perpendicular to the central axis A is referred to as a radial direction, a side close to the central axis A in the radial direction is referred to as an inner peripheral side, a side away from the central axis A in the radial direction is referred to as an outer peripheral side, and a direction along a circumference of a circle having the central axis A as a center on the plane perpendicular to the central axis A is referred to a circumferential direction.

A plurality of hose ports 8b are formed on an outer peripheral portion of the air ring 8 at equal intervals in the circumferential direction. A hose (not show) is connected to each of the plurality of hose ports 8b and the cooling air is fed from a blower (not show) into the air ring 8 via the hoses. The cooling air fed into the air ring 8 is blown out from the outlet 8a and is sprayed on the molten resin.

The rectifying member 9 is disposed in the air ring 8 to surround the outlet 8a. The rectifying member 9 rectifies the cooling air fed into the air ring 8. Accordingly, the cooling air blows out from the outlet 8a with a uniform flow rate and wind speed in the circumferential direction.

The die device 2 includes a die body 10, an inner peripheral member 12, an outer peripheral member 14, and a plurality of (here, 32) adjustment portions 16. The inner peripheral member 12 is an approximately columnar member which is disposed on an upper surface of the die body 10. The outer peripheral member 14 is an annular member and surrounds the inner peripheral member 12. The slit 18 extending in a ring shape in the vertical direction is formed between the inner peripheral member 12 and the outer peripheral member 14. The molten resin flows upward through the slit 18, the molten resin is extruded from a discharge port (that is, an upper end opening) 18a of the slit 18 and is cooled by the cooling device 3, and thus, a film having a thickness corresponding to a width of the discharge port 18a is formed.

The plurality of adjustment portions 16 are disposed in the circumferential direction with substantially no gap so as to surround an upper end side of the outer peripheral member 14. Particularly, each of the plurality of adjustment portions 16 is attached to the outer peripheral member 14 in a cantilever manner. The cooling device 3 is fixed to a portion above the plurality of adjustment portions 16. Each of the plurality of adjustment portions 16 is configured to be able to apply a radially inward pressing load or a radially outward tensile load to the outer peripheral member 14. The pressing load or the tensile load is applied to the outer peripheral member 14, and thus, the outer peripheral member 14 is elastically deformed. Accordingly, the width of the discharge port 18a can be partially adjusted in the circumferential direction and the thickness of the film can be partially controlled in the circumferential direction by adjusting the plurality of adjustment portions 16. For example, in a case where variations in the thickness of the film occur, a tensile load is applied from the adjustment portion 16 (for example, is disposed below a portion having a small thickness) corresponding to the portion having a small thickness to the outer peripheral member 14, and thus, the gap of the discharge port 18a below the portion having a small thickness increases. Accordingly, the variations in the thickness of the film decrease.

For example, as shown in FIG. 2, each adjustment portion 16 includes a lever 34 which is supported with a rotary shaft 32 as a fulcrum and receives a rotating force of an actuator 24, and an operation rod 36 which is supported to be displaceable in the axial direction by the die device 2 and is supported at an operation point of the lever 34. In addition, the rotating force of the lever 34 is converted into an axial force of the operation rod 36, the axial force becomes a load with respect to the inner peripheral member 12 or the outer peripheral member 14, and the lever 34 applies a direct force to the operation rod 36 at the operation point of the lever 34.

Figure 4:
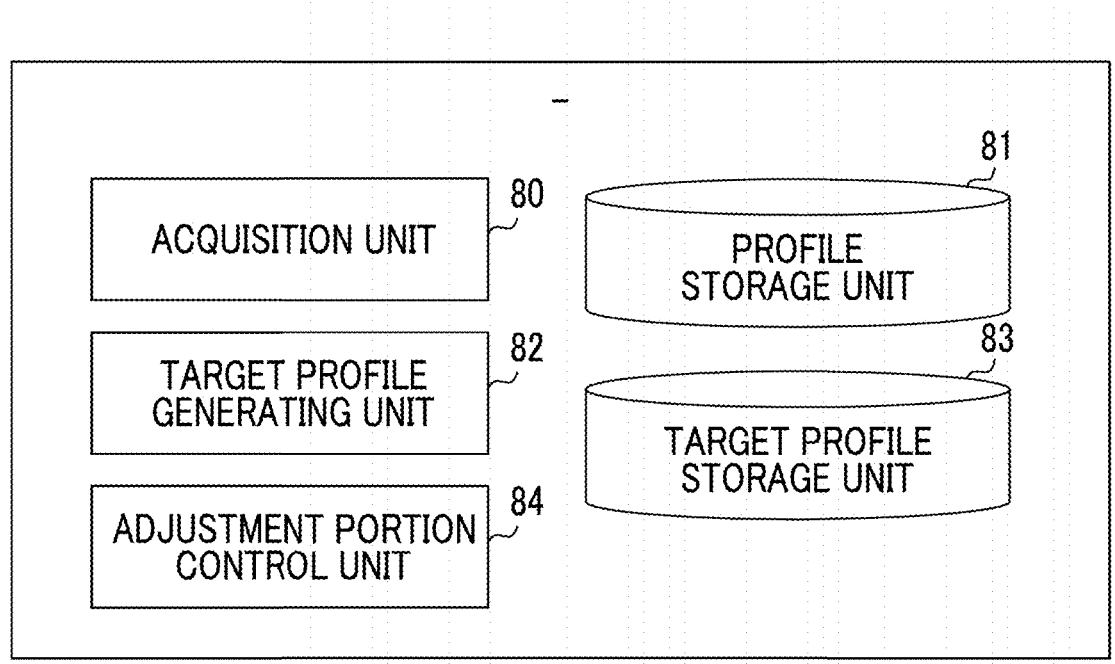
FIG. 4 is a block diagram schematically showing a function and a configuration of the controller of FIG. 1.

FIG. 4 is a block diagram schematically showing a function and a configuration of the controller 7. In terms of hardware, each block shown here can be realized by an element such as a CPU of a computer or a mechanical device, and realized by a computer program or the like in terms of software. However, each block is drawn as a functional block which is realized by cooperation of hardware and software. Therefore, a person skilled in the art will understand that these functional blocks can be realized in various forms according to a combination of hardware and software.

The controller 7 includes an acquisition unit 80, a profile storage unit 81, a target profile generating unit 82, a target profile storage unit 83, and an adjustment portion control unit 84. The acquisition unit 80 acquires the measurement result measured by the thickness sensor 6, that is, the thickness profile of the film in the circumferential direction.

The profile storage unit 81 stores the thickness profile acquired by the acquisition unit 80. As described later, the target profile storage unit 83 stores a target thickness profile generated by the target profile generating unit 82.

Figure 5A:
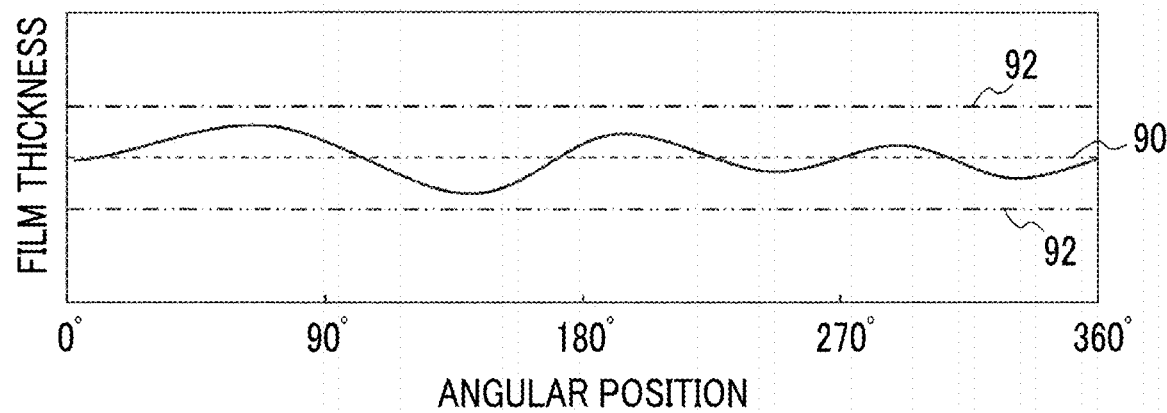
FIG. 5A is a graph schematically showing an example of a profile stored in a profile storage unit and FIG. 5B is a graph schematically showing a target thickness profile stored in a target profile storage unit.
Figure 5B:
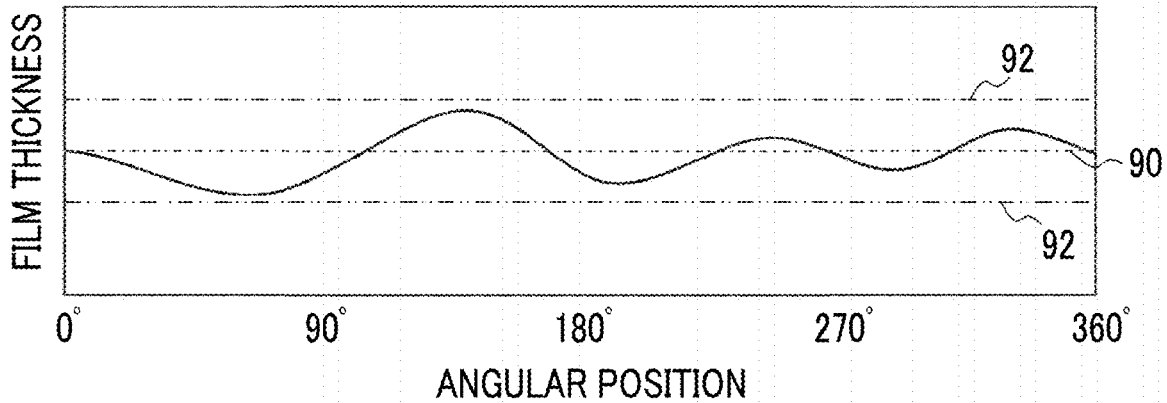

FIG. 5A is a graph schematically showing an example of a profile stored in the profile storage unit 81 and FIG. 5B is a graph schematically showing the target thickness profile stored in the target profile storage unit 83. In FIGS. 5A and 5B, a horizontal axis indicates an angular position in the circumferential direction and a vertical axis indicates the film thickness. Lines 90 which are dashed lines indicate reference film thicknesses which are ideal film thicknesses set by a user. Lines 92 which are two-dot chain lines indicate allowable thickness ranges determined by the reference film thickness.

The target profile generating unit 82 generates the target thickness profile. As described later, until the thickness profile falls within the allowable thickness range, the reference film thickness is taken as the target thickness profile which is a target of the film thickness, and die device 2 is controlled so that the film thickness approaches the reference film thickness as the target thickness profile. After the thickness profile falls within allowable thickness range, die device 2 is controlled such that the thickness profile approaches the target thickness profile generated by the target profile generating unit 82. Here, even after the thickness profile is within the allowable thickness range, if the die device 2 is controlled such that the film thickness approaches the reference film thickness, the film thickness can be maintained within the allowable thickness range. However, the film contains somewhat variations in the film thickness. Therefore, even when the film thickness is maintained within the allowable thickness range, a protrusion or recess may be generated in the film roll body 11. Therefore, in the present embodiment, after the thickness profile falls within the allowable thickness range, the target profile generating unit 82 changes the target thickness profile such that the protrusion or recess cannot be generated in the film roll body 11, that is, the thickness of the film roll body 11 is uniform in a width direction.

Specifically, the target profile generating unit 82 sets, as the target thickness profile, a profile in which the film thickness is thinner than the reference film thickness at a position at which the film thickness is thicker than the predetermined reference film thickness and the film thickness is thicker than the reference film thickness at a position which the film thickness is thinner than the reference film thickness (refer to FIGS. 5A and 5B). In the present embodiment, the target profile generating unit 82 generates, as the target thickness profile, a profile obtained by inverting the measured thickness profile (the thickness profile stored in the profile storage unit 81) with respect to the reference film thickness.

Returning to FIG. 4, the adjustment portion control unit 84 controls the plurality of adjustment portions 16, based on the reference film thickness and the target thickness profile stored in the target profile storage unit 83. First, the adjustment portion control unit 84 controls the plurality of adjustment portions 16 based on the reference film thickness as the target thickness profile, and if the film thickness falls within the allowable thickness profile, the adjustment portion control unit 84 controls the plurality of adjustment portions 16 based on the target thickness profile generated based on the measured thickness profile, that is, based on the target thickness profile stored in the target profile storage unit 83.

Specifically, with reference to the target thickness profile (that is, the reference film thickness or the target thickness profile stored in the target profile storage unit 83), the adjustment portion control unit 84 sends a control command for applying a pressing load corresponding to a difference between the film thickness and the target thickness profile to the outer peripheral member 14 to the adjustment portion 16 corresponding to a circumferential portion in which the measured film thickness exceeds (that is, is thicker than) the target thickness profile. Accordingly, a radial gap of the portion of the corresponding discharge port 18a is narrowed, the film thickness of the corresponding portion decreases, and thus, the film thickness approaches the target thickness profile. In addition, the adjustment portion control unit 84 sends a control command for applying a tensile load corresponding to a difference between the film thickness and the target thickness profile to the outer peripheral member 14 to the adjustment portion 16 corresponding to a circumferential portion in which the film thickness is less than (that is, is thinner than) the target thickness profile. Accordingly, a radial gap of the portion of the corresponding discharge port 18a is widened, the film thickness of the corresponding portion increase, and thus, the film thickness approaches the target thickness profile.

An operation of the film forming apparatus 1 configured as described above will be described.

Figure 6:
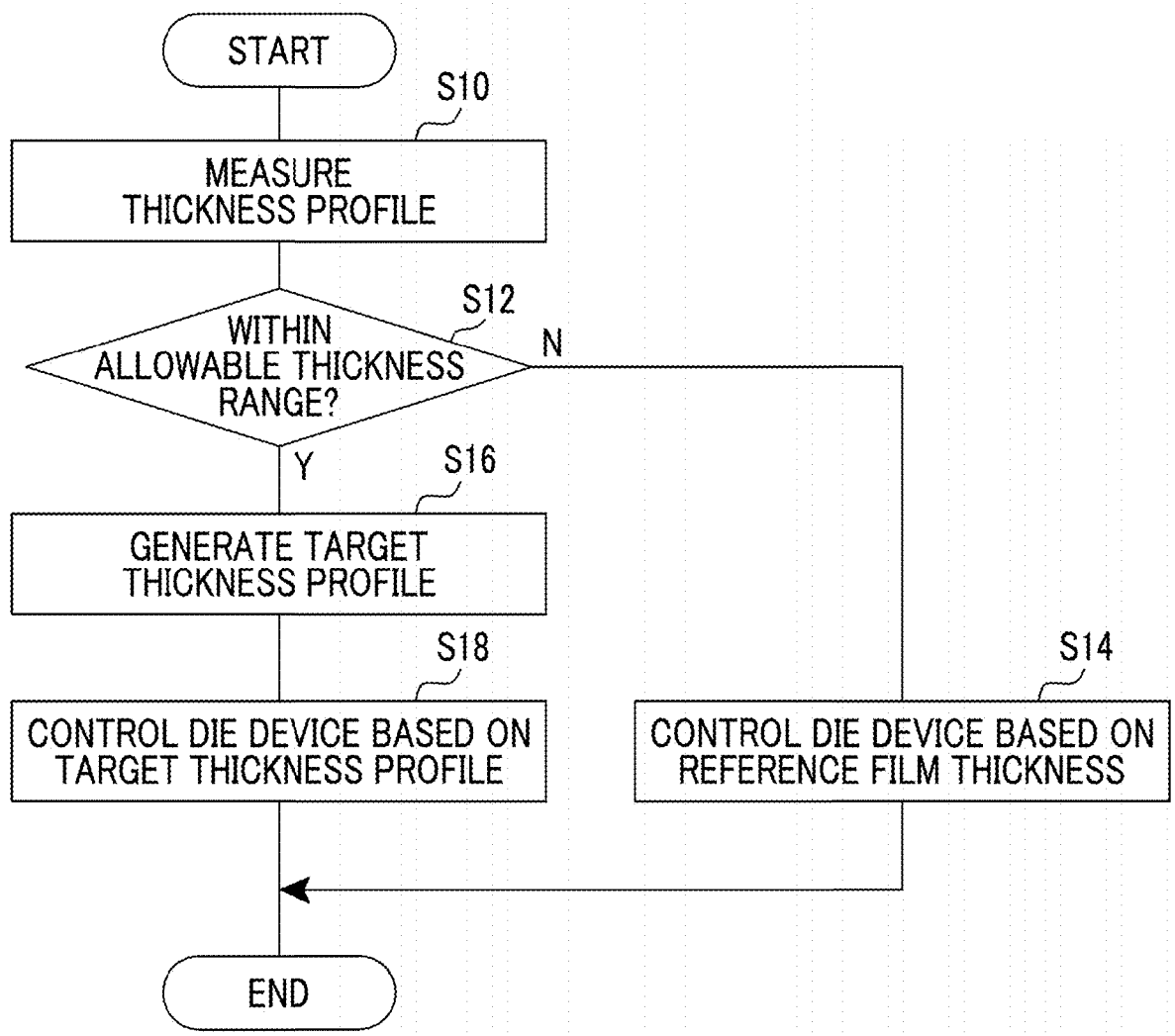
FIG. 6 is a flowchart showing processing of the film forming apparatus.

FIG. 6 is a flowchart showing processing of the film forming apparatus 1. The processing shown in FIG. 6 is loop processing repeatedly performed at regular intervals. For example, in a case where the thickness sensor 6 measures the thickness profile obtained by averaging the measurement results of five laps, the processing may be repeatedly performed for each time required for the thickness sensor 6 to make five rounds around the film.

The thickness sensor 6 measures the thickness profile of the film in the circumferential direction (S10). In a case where the film thickness does not fall within the allowable thickness range based on the reference film thickness (N in S12), the controller 7 controls the die device 2 based on the reference film thickness such that the film thickness approaches the reference film thickness as the target thickness profile (S14). If the film thickness falls within the allowable thickness range (Y in S12), the controller 7 generates the target thickness profile generated based on the measured thickness profile, that is, the target thickness profile obtained by inverting the measured thickness profile with respect to the reference film thickness (S16), and the controller 7 control the die device 2 based on the target thickness profile generated such that the film thickness approaches the generated target thickness profile (S18).

Hereinafter, according to the film forming apparatus 1 of the present embodiment described above, the thickness profile of the film is inverted with respect to the reference film thickness for each predetermined timing. Accordingly, when the film roll body 11 is formed, a portion having a thickness thicker than the reference film thickness and a portion having a thickness thinner than the reference film thickness are pile up and averaged, and thus, the thickness of the film roll body 11 is uniform in the width direction. Accordingly, unlike the related art, the film roll body 11 can have a relatively small protrusion or recess or a small protrusion or recess.

Second Embodiment

A main difference between a film forming apparatus according to the second embodiment and the film forming apparatus 1 according to the first embodiment is a method for generating the target thickness profile.

In the present embodiment, the target profile generating unit 82 divides the measured thickness profile (thickness profile stored in the profile storage unit 81) into a plurality of section profiles, and sets each of the plurality of divided section profiles as the target thickness profile of another section.

Figure 7A:
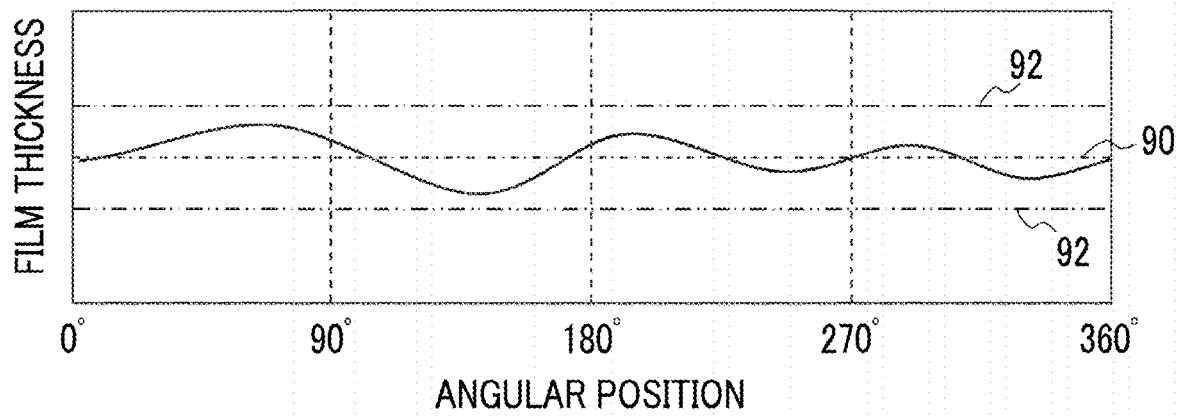
FIG. 7A is a graph schematically showing an example of a profile stored in a profile storage unit of a film forming apparatus according to a second embodiment and FIG. 7B is a graph schematically showing a target thickness profile stored in a target profile storage unit.
Figure 7B:
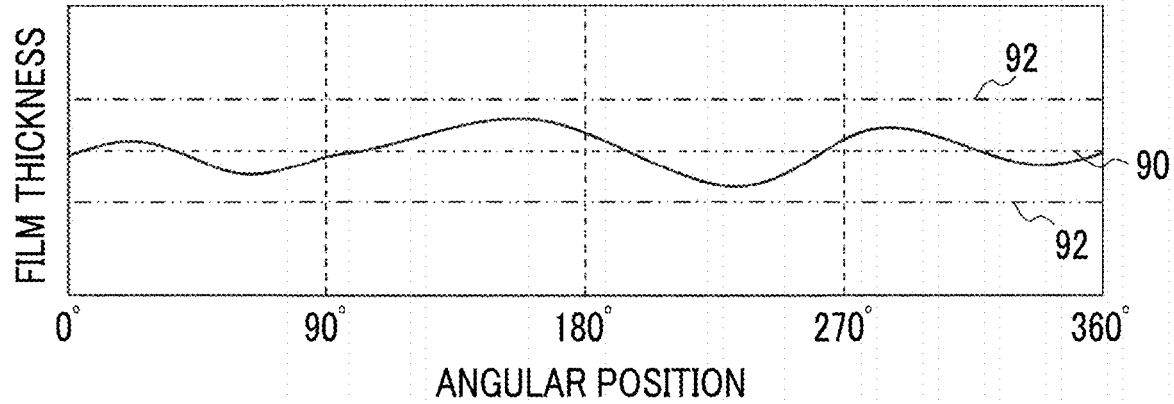

FIG. 7A is a graph schematically showing an example of a profile stored in the profile storage unit 81 and FIG. 7B is a graph schematically showing the target thickness profile stored in the target profile storage unit 83.

In this example, the thickness profile is divided into four section profiles of 0° to 90°, 90° to 180°, 180° to 270°, and 270° to 360°, the section profile of 0° to 90° is referred to as the target thickness profile of 90° to 180°, the section profile of 90° to 180° is referred to as the target thickness profile of 180° to 270°, the section profile of 180° to 270° is referred to as the target thickness profile of 270° to 360°, and the section profile of 270° to 360° is referred to as the target thickness profile of 0° to 90°. That is, the target thickness profile are obtained by shifting phases of the measured thickness profiles by 90°. In this case, the target profile generating unit 82 generates the target thickness profile by shifting the phase of the thickness profile by 90° each time the processing shown in FIG. 6 is performed repeatedly.

According to the film forming apparatus according to the present embodiment, the same operational effects as those of the film forming apparatus 1 according to the first embodiment are exhibited.

Third Embodiment

A main difference between the film forming apparatus according to a third embodiment and the film forming apparatus according to the first embodiment is that the adjustment portion control unit basically control unit controls the plurality of adjustment portions 16 based on the reference film thickness even when the film thickness falls within the allowable thickness range.

In the present embodiment, similar to the first embodiment, the target profile generating unit 82 sets, as the target profile, the profile in which the film thickness is thinner than the reference film thickness at the position at which the measured film thickness is thicker than the reference film thickness and the film thickness is thicker than the reference film thickness at the position which the measured film thickness is thinner than the reference film thickness (refer to FIGS. 5A and 5B).

Unlike the first embodiment, the adjustment portion control unit 84 basically controls the plurality of adjustment portions 16 based on the reference film thickness. That is, first, the adjustment portion control unit 84 controls the plurality of adjustment portions 16 based on the reference film thickness as the target thickness profile and controls the plurality of adjustment portions 16 based on the reference film thickness even after the film thickness falls within the allowable thickness range. However, if the film thickness falls within the allowable thickness range, the adjustment portion control unit 84 temporarily controls the adjustment portion 16 based on the target thickness profile generated by the target profile generating unit 82 at a predetermined timing.

That is, in the present embodiment, the plurality of adjustment portions 16 are basically controlled such that the film thickness approaches the reference film thickness. However, the plurality of adjustment portions 16 are controlled such that the film thickness of the film portion having the thickness thicker than the reference film thickness is temporarily thinner than the reference film thickness at a predetermined timing. In addition, the plurality of adjustment portions 16 are controlled such that the film thickness of the film portion having the thickness thinner than the reference film thickness is temporarily thicker than the reference film thickness at a predetermined timing.

According to the film forming apparatus according to the present embodiment, the same operational effects as those of the film forming apparatus 1 according to the first embodiment are exhibited.

In addition, the target film thickness at each position in the circumferential direction may be temporarily changed to any thickness within a predetermined range at any time while the plurality of adjustment portions 16 are controlled based on the reference film thickness even after the film thickness falls within the allowable thickness range. In this case, the generation of the target profile by the target profile generating unit 82 is not necessary.

Hereinbefore, the configurations and the operations of the film forming apparatuses according to the embodiments are described. It is to be understood by a person skilled in the art that the embodiments are examples, that various modifications can be made to combinations of the respective constituent elements, and that the modification examples are also within the scope of the present invention.

Modification Example 1

In the second embodiment, the case is described, in which the target profile generating unit 82 generates the target thickness profile by shifting the thickness profile by the phase of 90°. However, the present invention is not limited to this. For example, the target profile generating unit 82 may generate the target thickness profile by shifting the phase of 30°, 45°, 60°, 120°, or the phase of other predetermined angle.

Moreover, in the second embodiment, the case is described, in which the target profile generating unit 82 shifts the thickness profile by the phase of 90°, that is, slides each of the four divided section profiles to be set to the target thickness profile of the adjacent section. However, the present invention is not limited to this. The divided section profile may be set to the target thickness profile of any section. Moreover, the thickness profile may be divided into two, three, or five or more section profiles.

Modification Example 2

In the first to third above-described embodiments, the case is described, in which the film thickness is partially changed in the circumferential direction so as to change the thickness profile of the film by widening or narrowing the radial gap of the discharge port 18a of the slit 18 using the adjustment portion 16. However, the present invention is not limited to this. The film thickness may be partially changed in the circumferential direction so as to change the thickness profile of the film by partially changing circumferentially an air volume and an air temperature of the cooling air blown out from the cooling device 3. In this case, the cooling device 3 may include a plurality of valves for adjusting the air volume or a plurality of heaters in the air ring 8.

Modification Example 3

In the first to third above-described embodiments, the case is described, in which the die device 2 is a so-called round die in which the discharge port 18a is annular. However, the present invention is not limited to this. A technical idea of the embodiments can also be applied to a so-called T die in which the discharge port is linear.

It should be understood that the invention is not limited to the above-described embodiment, but may be modified into various forms on the basis of the spirit of the invention. Additionally, the modifications are included in the scope of the invention.

The present invention can be used in a film forming apparatus.

What is claimed is:

1. A film forming apparatus comprising:
a die device comprising:
a discharge port that is configured to extrude, when a molten material flows through the discharge port, the molten material, and
a plurality of adjustment portions that surround, in a top view of the die device, the discharge port;
a controller configured to control the adjustment portions; and
a thickness measurement device configured to measure a thickness of each of a plurality of divided sections of a film formed by solidifying the molten material;
wherein the adjustment portions are configured to adjust a width of the discharge port, and
the controller is configured to set target thicknesses for the divided sections that are different depending on the thickness of each of the divided sections measured by the thickness measurement device.

2. The film forming apparatus according to claim 1, wherein the discharge port is configured to form, when the discharge port extrudes the molten material, a molten resin in a tube shape.

3. The film forming apparatus according to claim 1, wherein the molten material is a resin.

4. The film forming apparatus according to claim 1, further comprising:
a cooling device comprising:
an outlet that is configured to feed, onto the molten material when the discharge port extrudes the molten material, a substance that cools the molten material in a manner that causes the molten material to solidify into the film.

5. The film forming apparatus according to claim 4, wherein the adjustment portions are configured to adjust, when the cooling device feeds the substance onto the molten material, the width of the discharge port.

6. The film forming apparatus according to claim 4, wherein the cooling device is affixed to the die device.

7. The film forming apparatus according to claim 4, wherein the adjustment portions are disposed between the discharge port and the cooling device.

8. The film forming apparatus according to claim 4, wherein the adjustment portions are configured to change, when the adjustment portions change the width of the discharge port, the thickness of the film.

9. The film forming apparatus according to claim 4, wherein the controller comprises:
an adjustment portion control unit that is configured to generate, when the controller determines that a thickness of one of the divided sections of the film is outside a predetermined range, a command that controls a part of the adjustment portions corresponding to the one of the divided sections in a manner that changes the width of the discharge port to adjust the thickness of the one of the divided sections of the film toward a reference film thickness.

10. The film forming apparatus according to claim 9, wherein the adjustment portion control unit is configured to generate, when the controller determines that the thickness of the one of the divided sections of the film is within a predetermined range, a command that controls the part of the adjustment portions corresponding to the one of the divided sections in a manner that changes the width of the discharge port to adjust the thickness of the one of the divided sections of the film toward a target thickness profile.

11. The film forming apparatus according to claim 10, wherein the controller is comprising:
a target profile generating unit that is configured to convert, when the controller acquires the thickness of each of the divided sections of the film from the thickness measurement device, the thickness of each of the divided sections of the film into the target thickness profile.

12. The film forming apparatus according to claim 10, wherein the target thickness profile is a profile having a film thickness that is thinner than a reference film thickness at a position where the thickness of the film is thicker than the reference film thickness.

13. The film forming apparatus according to claim 12, wherein the target thickness profile is the profile having the film thickness that is thicker than the reference film thickness at a position where the thickness of the film is thinner than the reference film thickness.

14. The film forming apparatus according to claim 9, wherein the thickness measurement device comprising:
a sensor that is configured to measure, when the cooling device feeds the substance onto the molten material, the thickness of each of the divided sections of the film.

15. The film forming apparatus according to claim 14, wherein the cooling device is disposed between the discharge port and the sensor.

16. The film forming apparatus according to claim 14, wherein the cooling device is disposed between the sensor and the adjustment portions.

17. The film forming apparatus according to claim 14, wherein the outlet is disposed between the discharge port and the sensor.

18. The film forming apparatus according to claim 14, wherein the sensor is electrically connected to the controller.

19. The film forming apparatus according to claim 1, wherein the controller is configured to:
- set, when a measured thickness of one of the divided sections is thicker than a predetermined thickness, a target thickness of the one of the divided sections to be thinner than the measured thickness of the one of the divided sections; and
- set, when the measured thickness of the one of the divided sections is thinner than the predetermined thickness, the target thickness of the one of the divided sections to be thicker than the measured thickness of the one of the divided sections.

20. The film forming apparatus according to claim 1, wherein the controller is configured to
- set, when a measured thickness of one of the divided sections is thicker than a predetermined thickness, target thicknesses of the other divided sections to be thicker according to the measured thickness of the one of the divided sections, and
- set, when the measured thickness of the one of the divided sections is thinner than the predetermined thickness, target thicknesses of the other divided sections to be thinner according to the measured thickness of the one of the divided sections.

* * * * *